United States Patent Office 3,799,800
Patented Mar. 26, 1974

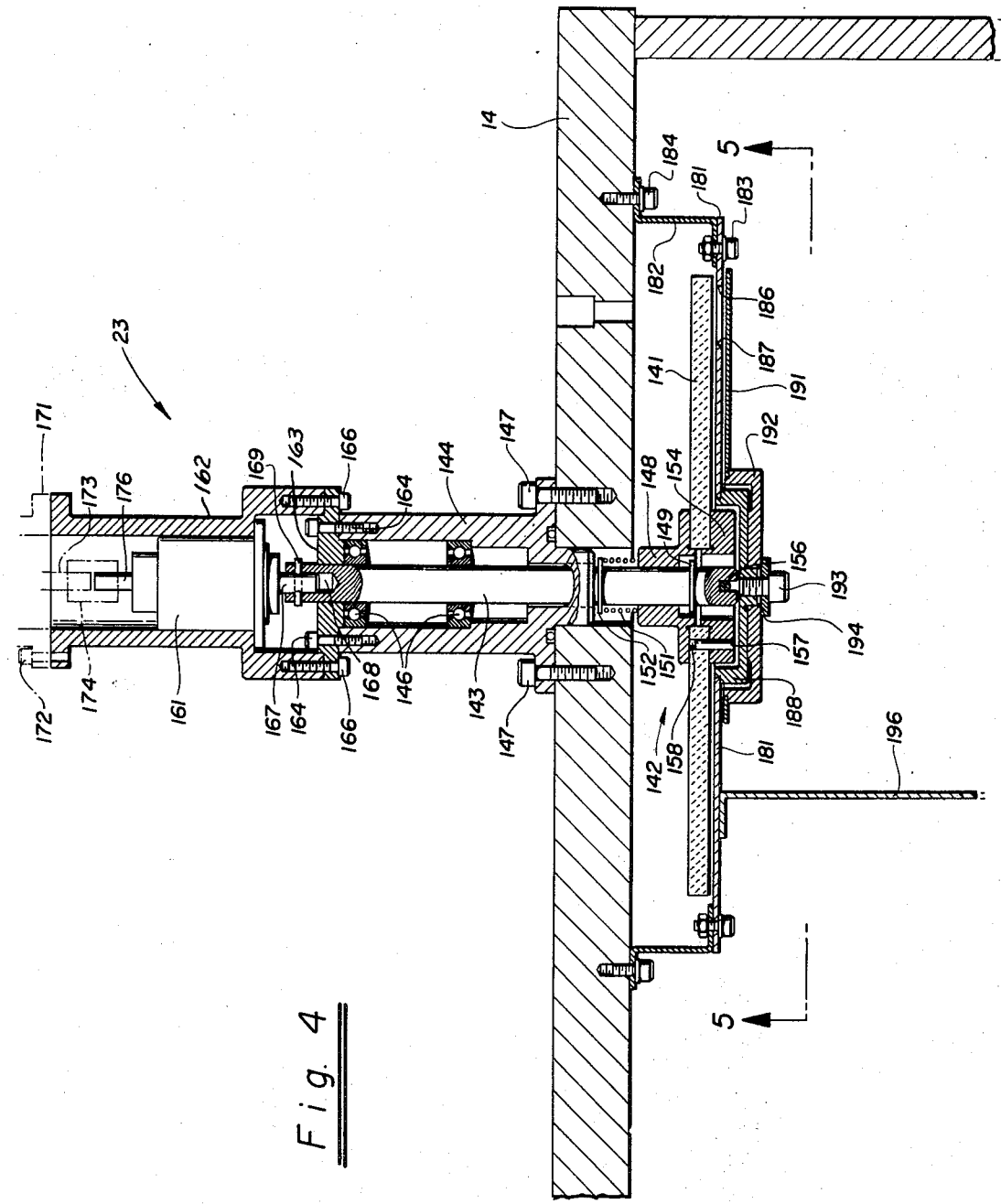

3,799,800
COATING METHOD UTILIZING TWO COATING MATERIALS
Alfred J. Thelen, Nils H. Bergfelt, and Eugene A. Eufusia, Santa Rosa, Calif., assignors to Optical Coating Laboratory, Inc., Santa Rosa, Calif.
Original application Mar. 14, 1966, Ser. No. 533,996, now Patent No. 3,636,916. Divided and this application July 19, 1971, Ser. No. 164,130
Int. Cl. C23c *11/00*
U.S. Cl. 117—106 R                3 Claims

ABSTRACT OF THE DISCLOSURE

A coating method for controlling the index of refraction of a layer upon a substrate by utilizing two coating materials having different indices of refraction by evaporating each of the coating materials to provide a vapor stream which impinges upon the substrate and masking the substrates from the vapor stream to provide a vapor stream carrying the coating materials to the substrate in a proportion related to the desired index of refraction.

This is a division of application Ser. No. 533,996, filed Mar. 14, 1966, now Pat. No. 3,636,916.

In coating operations, it often is desirable to utilize two coating materials and to deposit them simultaneously in a predetermined relationship. With existing coating machines, this is very difficult to do. In addition, it is very difficult to monitor the rate of deposition of each type of material. There is, therefore, a need for a new and improved coating apparatus, system and method, and a rate monitor for use therein.

In general, it is an object of the present invention to provide a method in which one or more evaporation sources may be utilized independently of each other or at the same time.

Another object of the invention is to provide a method of the above character in which the evaporation rate from any source can be controlled automatically.

Another object of the invention is to provide a method of the above character in which the rate of evaporation from the coating sources can be made to follow a pre-programmed function.

Another object of the invention is to provide a method of the above character in which the proportions of the different coating materials can be readily controlled.

Another object of the invention is to provide a method of the above character in which the proportioning of the coating materials is automatically programmed.

Another object of the invention is to provide a method of the above character in which the rates of deposition of the materials can be monitored optically.

Another object of the invention is to provide a method of the above character which does not require the use of separate chips.

Another object of the invention is to provide a method of the above character which is particularly useful for controlling deposition where a constant rate of deposition is required.

Additional objects and features of the invention will appear from the following description in which the preferred embodiment is set forth in detail in conjunction with the accompanying drawings.

Referring to the drawings:

FIG. 4 is an enlarged cross-sectional view of the rate monitor.

Figure 1:
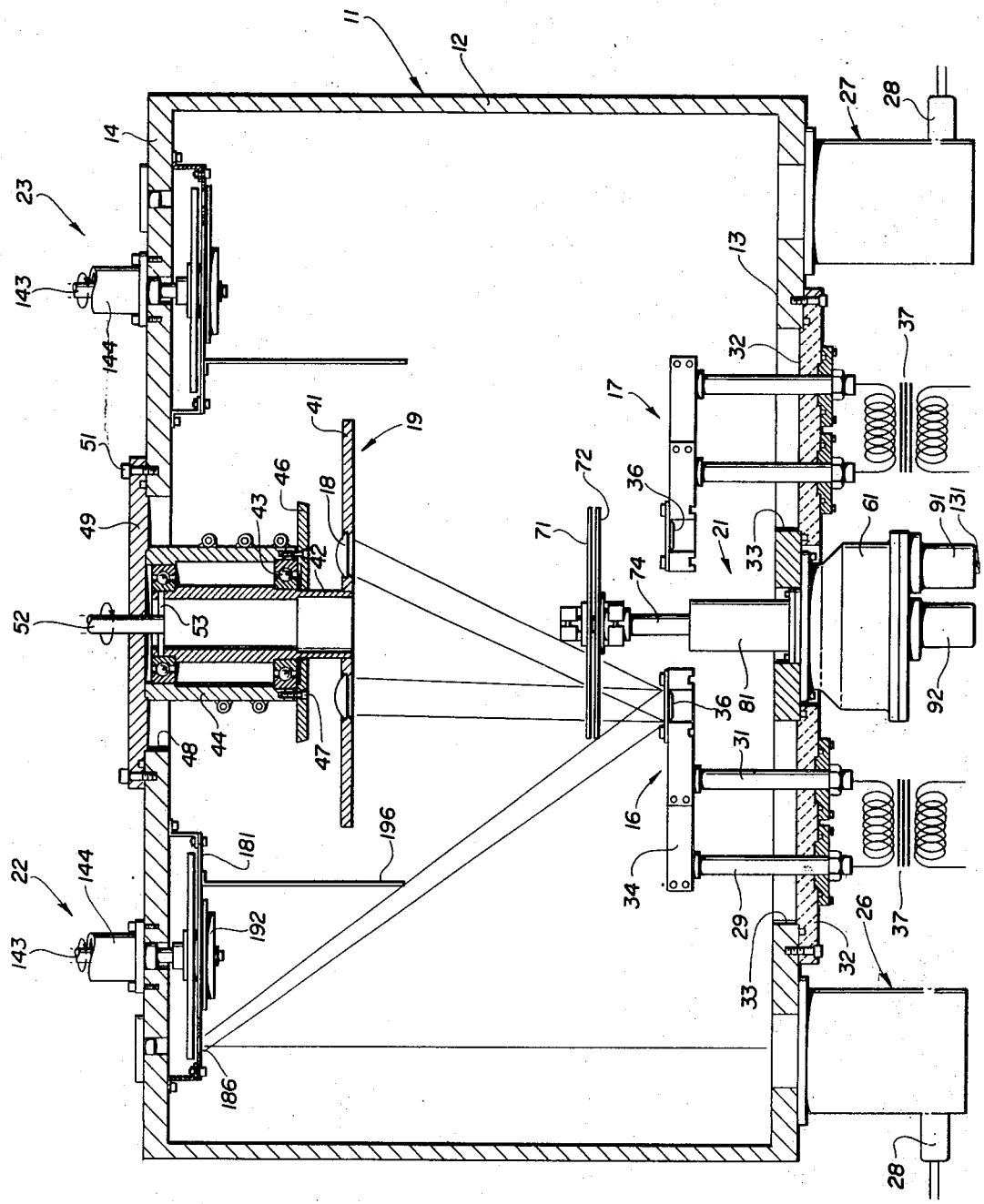
FIG. 1 is a cross-sectional view of a coating apparatus incorporating the present invention.

In general, the coating apparatus and system includes a chamber with means mounted in the chamber for carrying a plurality of substrates to be coated. First and second sources for vapor streams are disposed within the chamber. A particularly unique means is provided for monitoring the rate of evaporation from the sources. In addition, means is connected to the monitoring means and to the sources for causing the evaporation rate from the vapor sources to follow a pre-programmed function. In addition, masking means is provided for controlling the flow of vapor from each of the sources to the substrates being coated. Means is provided for automatically controlling the masking assembly to cause the deposition of the coating materials upon the substrate in a predetermined relationship.

As shown in the drawings, the coating apparatus incorporated in the present invention consists of an enclosed vacuum chamber or housing 11 which includes a side wall 12, a bottom wall 13 and a top wall 14. First and second source assemblies 16 and 17 are mounted in the bottom wall and are adapted to supply vapor streams to the substrates 18 to be coated carried by a rotatable rack assembly 19. A mask indexing assembly 21 is mounted in the bottom wall between the first and second source assemblies 16 and 17. Means is provided for monitoring the rate of deposition of vapors upon the substrate 18 and consists of first and second substrate shifting assemblies 22 and 23 and first and second optical monitors 26 and 27. The optical monitors are of a type disclosed in copending application Ser. No. 321,888, filed Nov. 6, 1963, now Pat. No. 3,411,852, and as disclosed therein, each includes a sensing assembly 28.

The first and second source assemblies 16 and 17 are substantially conventional and each consists of a pair of conducting rods 29 and 31 carried by mounting plate 32 formed of insulating material secured to the bottom wall 13. The rods 29 and 31 extend through an opening 33 provided in the bottom wall 13. The rods 29 and 31 carry a support assembly 34 which mounts a boat 36. As is well known to those skilled in the art, the support assembly 34 is arranged so that when power is supplied to the rods 29 and 31, power flows through the boat 36 which is formed of a resistive type material to heat the source material carried therein to cause the same to vaporize within the chamber 11. Power is supplied to the source assemblies 16 and 17 by transformers 37 which are connected to a suitable source of power (not shown).

As explained previously, the vapors from the boats 36 are adapted to impinge upon the substrates 18 carried by the rack assembly 19. The rack assembly 19 consists of a rack 41 of conventional construction which is mounted upon a spindle 42 rotatably carried by ball bearing assemblies 43 mounted in a bearing housing 44. The spindle 42 is also held in place by a plate 46 which is secured to the lower extremity of the bearing housing 44 by screws 47. The bearing housing 44 extends upwardly through an opening 48 provided in the top wall 14 and is secured to a mounting plate 49 which is secured to the top wall 14 by cap screws 51. A shaft 52 is rotatably mounted in the mounting plate 49 and is connected to the spindle 42 by a pin 53. The shaft 52 is rotated by suitable motive means such as an electric motor and a speed reducer (not shown) to rotate the rack 41 at a predetermined rate.

MASK INDEXING ASSEMBLY 21

Figure 2:
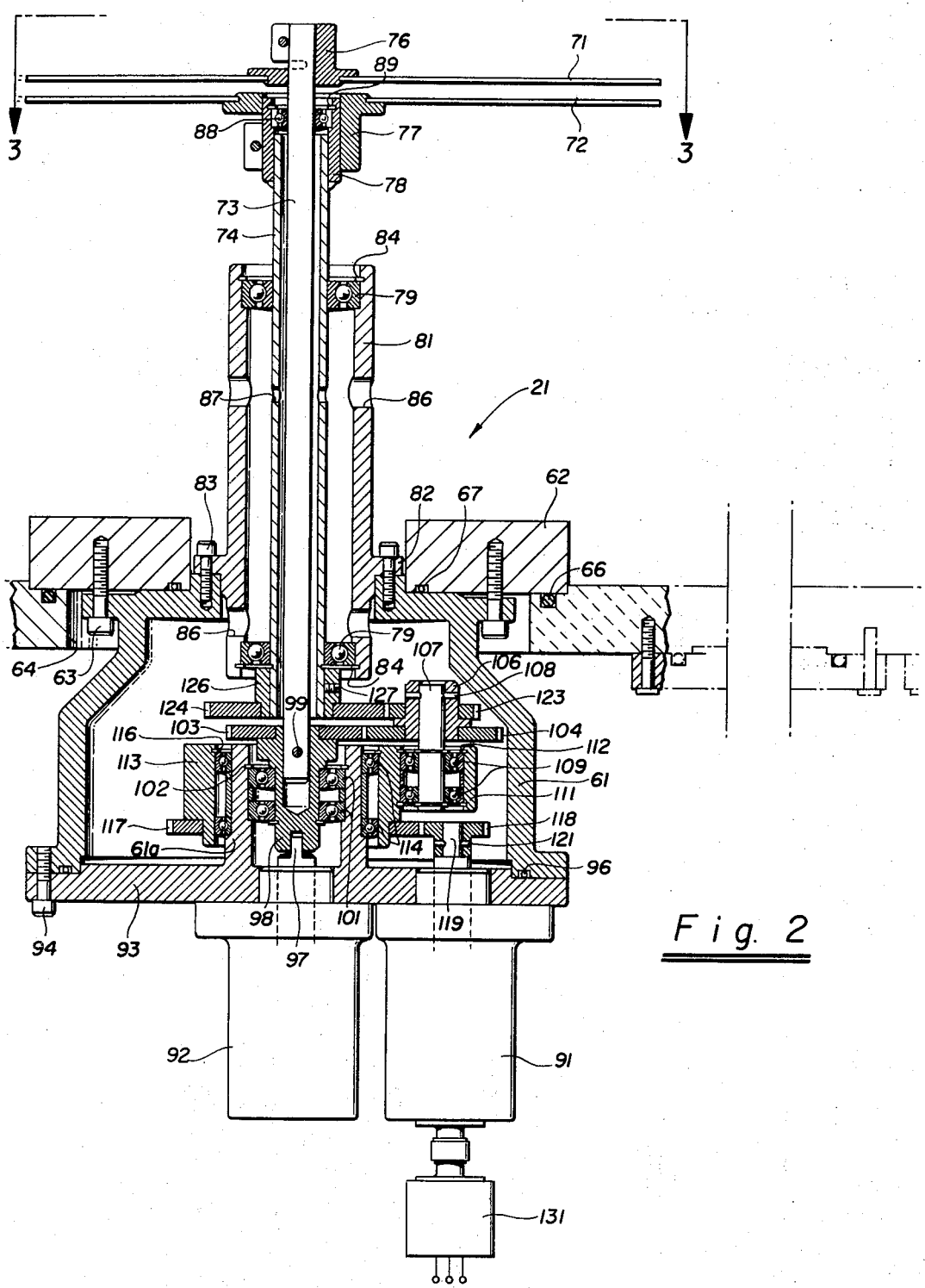
FIG. 2 is an enlarged cross-sectional view of the mask indexing assembly.
Figure 3:
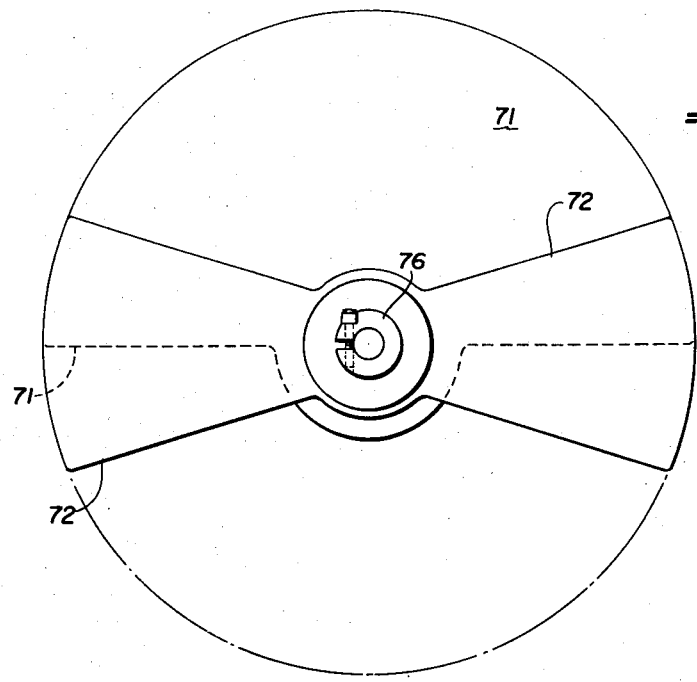
FIG. 3 is a view looking along the line 3—3 of FIG. 2 and showing the masks of the mask indexing assembly.
Figure 5:
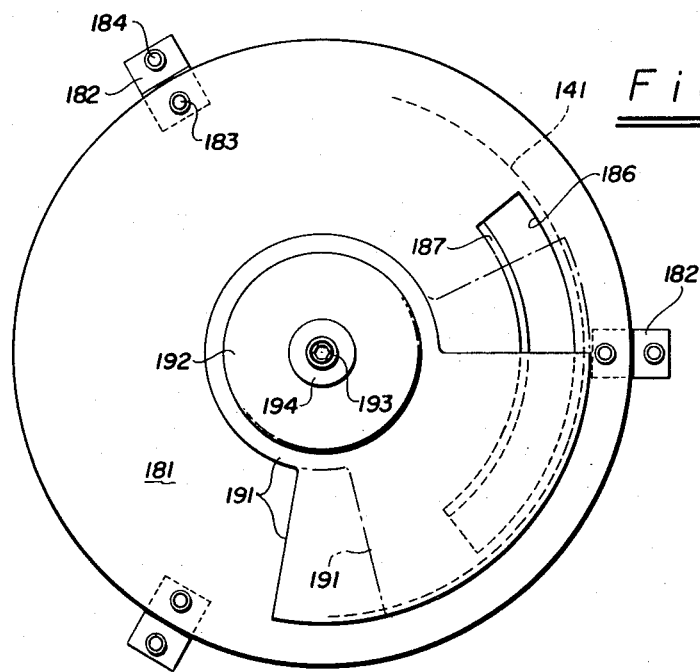
FIG. 5 is a view looking along the line 5—5 of FIG. 4 and shows the cover plate with the aperture therein and the mask for adjusting the size of the aperture.

The flow of vapors to the substrates 18 carried by the rack 41 is also controlled by the mask indexing assembly 21. The mask indexing assembly 21 is shown in detail in FIG. 2 and consists of a large housing 61 which is secured to a mounting plate 62 by screws 63. The mounting plate 62 overlies an opening 64 provided in the bottom wall 13. Suitable means is provided for forming a seal between the plate 62, the bottom wall 13 and the housing 61 and consists of O-rings 66 and 67.

The mask indexing assembly 21 also includes first and second masks 71 and 72 which are carried by concentric shafts 73 and 74. The mask 71 is a 180° mask as hereinafter described and is secured to the shaft 73 by a split hub 76. The mask 72 consists of two 90° masks and is mounted upon a split hub 77 which is mounted upon an enlarged end member 78 secured to the upper extremity of the shaft 74 by suitable means such as welding. The shaft 74 is rotatably mounted in ball bearing assemblies 79 carried in a bearing housing 81. The bearing housing 81 is provided with a flange 82 which is secured to the housing 61 by screws 83. The bearing assembly 79 is held in place by retaining rings 84. The bearing housing 81 is provided with openings 86 and the shaft 74 is provided with openings 87 which communicate with the interior of the chamber 11. The inner concentric shaft 73 is rotatably mounted within the outer shaft 74 by a ball bearing assembly 88 which is held in place by a retaining ring 89.

Means is provided for driving the shafts 73 and 74 and consists of gear motors 91 and 92. The gears motors 91 and 92 can be of any suitable type as, for example, the gear motor 91 can have a range of output speeds from zero to 100 r.p.m., whereas the gear motor 92 can have a range of output speeds from zero to 60 r.p.m. The gear motors 91 and 92 are mounted upon a plate 93 which is secured to the housing 61 by screws 94. A suitable seal is provided in the form of an O-ring 96.

The gear motor 92 is provided with an output shaft 97 which is connected to a coupling 98 by the tongue and slot connection shown. The coupling 98 is connected to the center shaft 73 by a pin 99. The coupling 98 is rotatably mounted in bearing assemblies 101 which are held in place by retaining rings 102. The bearing assemblies 101 are mounted in a cylindrical extension 61a formed as an integral part of the housing 61. A sun gear 103 is mounted upon the coupling 98 and drives a planetary cluster gear 104 mounted upon a hub 106. The hub 106 is secured to a shaft 107 by a pin 108. The shaft 107 is rotatably mounted in a pair of ball bearing assemblies 109 which are carried by a planetary arm 111 and retained therein by rings 112. The planetary arm 111 is mounted upon a large hub 113 which is rotatably mounted by ball bearing assemblies 114 on the outer surface of the cylindrical extension 61a and which are retained thereon by retaining rings 116. A large planetary gear 117 is mounted on the large hub 113 and is driven by the small gear 118 connected to the output shaft 119 of the gear motor 91 by pin 121. Another gear 123 is mounted on the hub 106 and drives a large gear 124 mounted upon a hub 126 secured to the lower extremity of the outer shaft 74 by set screw 127.

In addition, the gear motor 91 is directly connected to a motor driven potentiometer 131 which gives an exact indication of the shaft position of the gear motor 91.

MONITOR SUBSTRATE SHIFTING ASSEMBLIES 22 AND 23

The monitor substrate shifting assembly 23 is shown in detail in FIG. 4 of the drawings. As shown therein, it consists of a substrate 141 formed of a suitable material such as a glass or quartz disc and having a suitable diameter such as 8 inches. The substrate 141 is carried by a hub assembly 142 mounted upon a shaft 143. The shaft 143 is rotatably mounted in a bearing housing 144 by a pair of ball bearing assemblies 146. The housing 144 is mounted upon the top wall 14 of the chamber 11 and secured thereto by suitable means such as cap screws 147.

The hub assembly 142 consists of an upper hub member 148 which is slidably mounted on the lower extremity of the shaft and is normally retained thereon by a retaining ring 149 mounted on the shaft 143. A spring 151 is disposed on the shaft 143 and has its lower extremity engaging the upper portion of the upper hub member 148 and has its upper extremity engaging a retaining ring 152 secured to the shaft 143. The hub assembly 142 also includes a lower hub member 154 which is secured to the lower end of the shaft 143 by a pin 156. The lower hub member 154 engages the lower surface of the substrate 141 and is provided with a pin 157 which is disposed in a hole 158 provided in the substrate 141 so that when the shaft 143 is rotated, the substrate 141 is driven thereby. In addition, the spring 151 yieldably urges the upper hub member 148 into engagement with the upper surface of the substrate 141 so that the substrate 141 is firmly clamped between the upper hub member and the lower hub member 154.

The shaft 143 is driven by a speed reducer 161 which is mounted in a speed reducer housing 162. The housing 162 is mounted upon the bearing housing 144 by a plate 163 which is secured to the bearing housing 144 by screws 164 and to the speed reducer housing 162 by screws 166. The speed reducer 161 is provided with an output shaft 167 which is disposed in a bore 168 provided in the shaft 143 and is pinned to the shaft 143 by a pin 169. The speed reducer 161 is driven by an electric gear motor 171 which is secured to the speed reducer housing 162 by screws 172. The motor is provided with an output shaft 173 which is connected by a coupling 174 to an input shaft 176 of the speed reducer 161. The gear motor 171 can be of any suitable type as, for example, it can be one which has an output shaft which rotates at a speed of 60 r.p.m. The speed reducer 161 can still further reduce the speed so that the speed of rotation of the output shaft 167 is approximately one-half revolution per hour.

Means is provided so that only a predetermined portion of the substrate 141 is exposed at any one time and consists of a main circular cover plate 181 secured to an annular bracket 182 by bolts 183; the bracket 182 is secured to the bottom surfaces of the top wall 14 of the chamber 11 by screws 184. The cover plate 181 is provided with an arcuate opening or aperture 186 which subtends a suitable angle as, for example, an angle of 90°. The opening 186 is also of a suitable width as for example, one inch. As can be seen from FIG. 4, the opening 186 is defined on one side by an inclined surface 187 provided in the cover plate 181 which is inclined in the direction in which the vapors pass from the coating sources 16 and 17. A centrally disposed mounting member 188 is mounted upon the cover plate 181 and carries means which makes it possible to close off any portion or all of the opening 186. Such means consists of a segment or mask 191 which preferably subtends an angle which is greater than the angle subtended by the opening 186 so that the opening or aperture can be closed. The segment 191 is mounted upon a hub 192. The hub 192 is secured by suitable means such as a screw 193 and a washer 194 to the mounting member 188. It can be seen that merely by loosening the screw 193, the segment or mask 191 can be shifted to any desired angular position to close off any desired portion of the opening or aperture 186.

A plate 196 is secured to the cover plate 181 by suitable means such as welding and depends therefrom in a vertical direction. As can be seen from FIG. 4, it is mounted on the cover plate 181 between the opening 186 and the source which is farthest away so that the substrate 141 will only receive vapors from the closest source and not from the other source, as illustrated in FIG. 1.

ELECTRICAL CIRCUITRY

Figure 6:
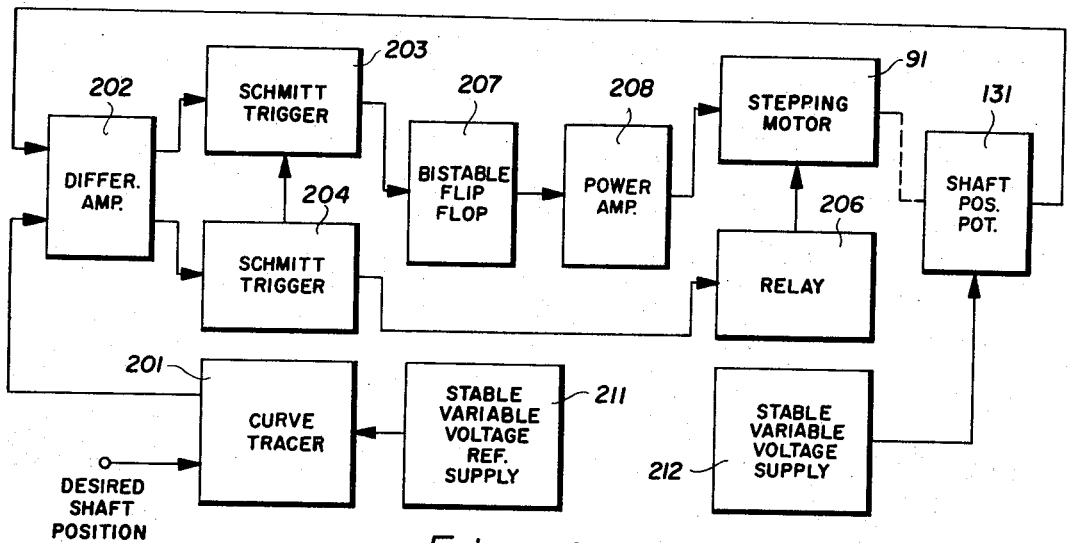
FIG. 6 is a block diagram of the electrical circuitry for the mask indexing assembly.
Figure 7:
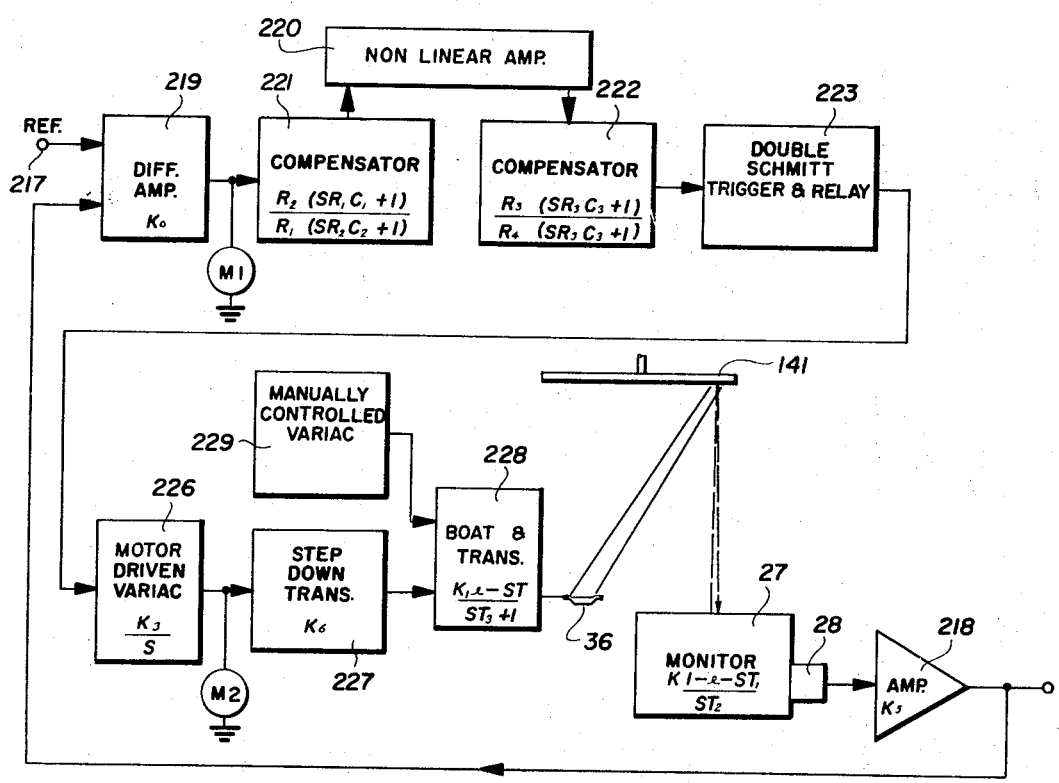
FIG. 7 is a block diagram of the electrical circuitry for the automatic rate control system.

Suitable electrical circuitry is provided as a part of the coating apparatus and includes electronics shown in block diagram form in FIG. 6 for the mask indexing assembly and electronics shown in block diagram form in FIG. 7 for the automatic rate control system. The electronics which is shown in FIG. 6 forms a part of the coating apparatus and is provided to form a system which automatically programs the mixture proportion of two coating materials from the sources 16 and 17 by controlling the mask indexing assembly 21.

Electronics of the type shown in FIG. 6 is provided for the stepping motor 91 of the mask indexing assembly 21. As shown in FIG. 6, the electronics includes a curve tracer 201 of a suitable type such as manufactured by the F. L. Moseley Division of Hewlett-Packard Company. As is well known to those skilled in the art, the curve tracer is adapted to receive a sheet of paper upon which there is deposited a conducting ink which represents the proportionality relationship for the coating which is to be deposited upon the substrates 18 carried by the rack assembly 19. The curve tracer 201 produces a signal proportional to the shape of the curve and supplies it to a differential amplifier 202. The signal form the curve tracer 201 serves as a reference signal and this signal is compared with a signal coming from the shaft position potentiometer 131 assuming that it is the stepping motor 91 which is being controlled by the electronics shown in FIG. 6. The differential amplifier takes the difference between the reference signal and the signal from the shaft position potentiometer 131 and supplies what is called an error output signal into two Schmitt trigger circuits 203 and 204. If the error is a positive error, the Schmitt trigger circuit 203 is operated, whereas if the error is negative, the other Schmitt trigger circuit 204 is operated. If the error is negative; or, in other words, on one side of zero or one polarity, a relay 204 is operated by the trigger circuit 204 which is connected to the motor 91 to reverse the direction of rotation of the stepping motor 91.

If either a negative or a positive error signal is supplied by the differential amplifier to the Schmitt trigger circuits 203 and 204, a bistable flip-flop 207 is triggered. The bistable flip-flop 207 is of a type which supplies a squarewave to a power amplifier 208. The bistable flip-flop 207 is also a type which, once triggered, will free-run until the error signal is zero. The stepping motor 91 is of a suitable type such as Slo-Syn 400 which is stepped by the squarewave from the power amplifier 208. Stepping of the motor 91 causes the mask 71 carried thereby to be shifted and at the same time causes the potentiometer 131 to be rotated a proportional amount until a signal is fed back to the differential amplifier 202 to reduce the error signal from the amplifier 202 to zero. As soon as there is no error, the Schmitt trigger circuits 203 and 204 are triggered to turn off the bistable flip-flop 207 which stops free running and which, in turn, causes the stepping motor 91 to stop rotating. As can be seen from FIG. 6, stable voltage supplies 211 and 212 are provided for the curve tracer 201 and for the potentiometer 131, respectively.

Motor 92 is a non-programmed constant speed motor which operates directly on 115 v. AC line voltage.

By utilizing this type of automatic control, it can be seen that the index of refraction of the material being deposited on the substrate can be varied from the index of refraction of one material being evaporated in the chamber 11 to the index of refraction of the other material being evaporated in the chamber 11. In addition, it is possible to make a smooth transition between the indices of refraction of the two materials being utilized.

The automatic rate control system which is shown in FIG. 7 is provided for controlling the rate of evaporation from each of the first and second source assemblies 16 and 17. In the coating apparatus herein described, the automatic rate control system is utilized for maintaining a constant rate of evaporation from each of the coating sources 16 and 17. However, it should be appreciated that this automatic rate control system can be utilized for providing a rate of evaporation following any pre-programmed function. When a constant coating rate is desired, a constant reference is supplied to the reference terminal 217 in FIG. 7. If a pre-programmed function is to be followed, the function may be applied to a chart mounted on a curve tracer. The output from the curve tracer is supplied to the reference terminal 217. The rate of evaporation from the boat 36 is monitored by the evaporation rate monitor 27 and its transducer 28 which supplies a signal to an amplifier 218. The amplifier 218 can be of any suitable type such as the Type 415D manufactured by Hewlett-Packard Company.

The output from the amplifier 218 is supplied to a differential amplifier 219 which compares this feedback signal with the reference signal supplied to the differential amplifier from the reference terminal 217. The error signal which is supplied by the differential amplifier is measured by the error meter M1. The error signal is fed into a first compensator 221 through a non linear amplifier 220 and then to a second compensator 222. The compensators 221 and 222 prevent the system from hunting beyond desired ranges or, in other words, to prevent the system from becoming unstable. The first compensator generates a phase lead which is utilized for compensating for the dead time in the evaporation rate monitor. This dead time occurs because it takes a predetermined amount of time for the monitor disc 141 to rotate past the window or opening 186 provided in the main cover 181. The amount of this dead time changes as the window size is changed. The second compensator 222 generates a phase lead with a phase lag and compensates for a long time delay constant which is caused by the time required to change the temperature of the boat to change the evaporation rate.

The output from the second compensator 222 is supplied to a double Schmitt trigger and relay 223, similar to that shown in FIG. 6, which serves as a relay with dead time. The double Schmitt trigger and relay 223 supplies an output to a motor-driven Variac 226 which supplies either a bucking or a boosting voltage to the primary of a step-down transformer 227. The step-down transformer 227, in turn, supplies a bucking or boosting voltage to a boat transformer 228 in series with the voltage supplied by a manually controlled Variac 229. The boat transformer 228 then supplies a voltage to the boat 36 to heat the boat. Heating the boat causes material in the boat to evaporate to cause a vapor stream to flow therefrom and to be deposited upon the monitor substrate 141. The rate the material is deposited upon the substrate 141 is monitored by the evaporation rate monitor 27 which supplies a signal to the amplifier 218 to provide the feedback signal for the differential amplifier 219 as hereinbefore described. When the error signal from the differential amplifier 219 reaches zero, the double Schmitt trigger circuit 223 will be burned off to stop the motor driven Variac 226.

It will be noted that a number of the blocks shown in FIG. 7 have been provided with conventional feedback control notation to indicate the manner in which they are designed.

Operation of the coating apparatus and system in performing the method can now be described briefly in conjunction with the rate monitor. Let it be assumed that the rack assembly 19 has been loaded with substrates 18 to be coated and that the desired materials to be utilized for the coating operation have been placed in the boats 36. The coating apparatus can then be placed in operation. The rack assembly 19 is continuously rotated and the mask indexing assembly 21 is placed in operation. Then, either one or both the source assemblies 16 and 17 are also placed in operation to heat the boats 36. It should be appreciated, however, that the mask indexing assembly 21 is under the control of electronics of the type shown in FIG. 6, whereas the source assemblies 16 and 17 are under the control of electronics such as that shown in FIG. 7.

As can be seen from FIG. 1, while the coating apparatus is in operation, the masks 71 and 72 are positioned so that they control the flow of the vapor stream from each of the sources 36 to the substrates 18 carried by the rack assembly 19. Also, it can be seen from FIG. 1 that each of the monitor substrate shifting assemblies will only receive a vapor stream from one of the two sources contained in the coating apparatus. This is because the member 196 prevents the vapor stream from the other of the sources from reaching the opening or window 186 provided in the cover plate 181. It also should be noted that the monitor substrate shifting assemblies 22 and 23 actually see the vapor stream from their respective sources without their being chopped by the masks 71 and 72. In other words, they see their respective vapor sources continuously. By controlling the source assemblies 16 and 17 so they supply vapors at a constant rate to the monitor substrate shifting assemblies, it can be seen that by changing the phase relationship of the masks 71 and 72 under the control of the electronics shown in FIG. 6, it is possible to vary the rate of deposition of each of the coating materials upon the substrates 18. With the arrangement shown, it can be seen that coatings of the two different types of material can be deposited upon the substrates separately, or they can be deposited simultaneously to obtain any desired mixture. Thus, one layer upon the substrate can consist of 30% of one coating material, and 70% of the other material. Also, with the coating apparatus shown, it is possible to make a continuous transition from one index of refraction for one coating material to the other index of refraction for the other coating material. Also, it is possible to utilize the apparatus for providing a layer which has an index of refraction which is between the ones available from the two materials being utilized. Thus, it is possible by evaporating both materials simultaneously to obtain a layer having an index of refraction which has the same ratio as the mixture of the coating materials. For example, a layer comprised of 50% of one material and 50% of the other material should be given an index of refraction which is between the indices of refraction of the two materials. In this way, it is possible to make coatings having indices of refraction which are not available from materials which appear in nature.

During the entire coating operation, the monitor substrates 141 are rotating very slowly. For example, in one embodiment of the invention, the glass disc rotated has a speed of approximately one-half revolution per hour. With this speed of rotation, it was found that each point of the substrate 141 was exposed to the vapor stream for 3⅓ minutes. By measuring the rate of deposition at the end of the opening 186, it is possible to measure the average rate with the 3⅓ minute time constant. This evaporation rate is being monitored by the evaporation rate monitor 27. If the evaporation rate changes, the thickness of the layer on the substrate 141 changes which, in turn, changes the reflectance which is measured by the monitor 27 to give a direct indication of the rate of evaporation of the coating vapors.

The size of the opening 186 determines the thickness of the layer which is measured by the monitor 27. There are a number of conflicting considerations involved. On the one hand, it is desirable to measure the reflectivity as quickly as possible in order to obtain a system which has a fast reaction. On the other hand, it is desirable to wait a period of time to make the measurements so that the coating will have a thickness which will give a large reflectivity which can be easily and accurately measured. The size of the opening of the hole 186 is, therefore, chosen so that it is a compromise between these two conflicting considerations. Thus, for a disc having a diameter of approximately 8 inches, an opening of ¾ inch has been found to be satisfactory.

In addition, the opening 186 should be positioned so that it can see the source of the coating vapors at all times and will not at any time be obstructed by masks 71 and 72 . In view of the fact that adhesion need not be considered, the angle of incidence of the vapor stream on the substrate 141 is not particularly critical.

The substrate 141 is rotated at a relatively slow speed so that in one revolution of the same, one complete coating comprised of many layers can be completed. It can be readily appreciated that if longer coating periods are required, larger glass discs can be provided for the substrates 141 to give the additional required time. Alternatively, the disc or substrate 141 can be rotated at a still slower rate.

The optical rate monitoring system utilized in the coating apparatus has many advantages. It is relatively stable and gives a larger signal than conventional devices. In addition, it is very rugged and reliable. The rate monitor herein disclosed may be useful in other applications. For example, it may be useful for a continuous process in which it is desired to deposit a coating of uniform thickness throughout the process.

It is apparent from the foregoing that we have provided a coating apparatus, system and method, and rate monitor therefor in which one or more evaporation sources may be utilized independently of each other or at the same time. The rate of evaporation from any of the sources can be controlled automatically and can be made to follow a pre-programmed function. In addition, the rates of deposition of the materials upon the substrates to be coated can be readily controlled by the use of the masking assembly. At the same time, the rate of evaporation can be readily monitored to give the desired control.

We claim:

1. In a method for controlling the index of refraction of a layer upon a plurality of substrates by utilizing two coating materials having different indices of refraction from first and second sources, continuously causing relative movement between the sources and the plurality of substrates, evaporating the two coating materials simultaneously to produce first and second vapor streams which impinge upon the substrates, monitoring the rates of evaporation of the two coating materials from the sources to supply monitoring information, automatically controlling the rates of evaporation from said sources by using said monitoring information to cause substantially constant evaporation rates of the two coating materials masking the substrates from the first and second vapor streams by the use of first and second masks, and automatically controlling the phase relationships between the first and second masks so that the coating materials from the first and second sources are deposited upon the substrates in a predetermined ratio.

2. A method as in claim 1 wherein said masking step is carried out with the first and second masks located in closer proximity to the sources of the coating materials than to the substrates being coated and wherein said first and second masks are rotated in accordance with a pre-programmed function in cooperation with each other whereby the layer deposited upon the substrates is comprised of a mixture of the two coating materials with proportions related to the pre-programmed function.

3. A method as in claim 2 wherein the monitoring is carried out by independently monitoring the rate of evaporation from each of the first and second sources.

References Cited

UNITED STATES PATENTS

| | | | |
|---|---|---|---|
| 2,160,981 | 6/1939 | O'Brien | 118—49 X |
| 3,271,179 | 9/1966 | Smith, Jr. | 117—106 R |
| 3,063,867 | 11/1962 | Emery, Jr. | 117—106 R |
| 3,316,386 | 4/1967 | Yaffe et al. | 118—49 |
| 3,071,533 | 1/1963 | Blankenship | 118—7 |
| 3,313,914 | 4/1967 | Roberts, Jr., et al | 118—7 |
| 3,347,701 | 10/1967 | Yamagishi, et al. | 117—106 R |

FOREIGN PATENTS

| | | | |
|---|---|---|---|
| 1,314,569 | 12/1962 | France | 350—166 |
| 1,051,402 | 12/1966 | Great Britain | 118—49.5 |

RALPH S. KENDALL, Primary Examiner

M. G. WITYSHYN, Assistant Examiner